US010948015B2

(12) United States Patent
Liverato et al.

(10) Patent No.: US 10,948,015 B2
(45) Date of Patent: Mar. 16, 2021

(54) BEARING

(71) Applicant: Aktiebolaget SKF

(72) Inventors: Yves-André Liverato, Saint Paterne Racan (FR); Vincent Sausset, Azay-le-Rideau (FR); Olivier Verbe, Tours (FR)

(73) Assignee: Aktiebolaget SKF, Gothenburg (SE)

( * ) Notice: Subject to any disclaimer, the term of this patent is extended or adjusted under 35 U.S.C. 154(b) by 0 days.

(21) Appl. No.: 16/673,818

(22) Filed: Nov. 4, 2019

(65) Prior Publication Data

US 2020/0166078 A1 May 28, 2020

(30) Foreign Application Priority Data

Nov. 22, 2018 (DE) .................. 10 2018 220 030.0

(51) Int. Cl.
*F16C 33/58* (2006.01)
*F16C 19/06* (2006.01)
(52) U.S. Cl.
CPC ............ *F16C 33/585* (2013.01); *F16C 19/06* (2013.01)
(58) Field of Classification Search
CPC ...... F16C 19/52; F16C 19/522; F16C 33/581; F16C 33/586; F16C 33/60; F16C 2233/00; F16C 41/007; F16C 43/04; Y10T 29/49696; G01M 13/04
See application file for complete search history.

(56) References Cited

U.S. PATENT DOCUMENTS

| | | | | |
|---|---|---|---|---|
| 4,511,837 A | * | 4/1985 | Vermeiren | F16C 19/52 |
| | | | | 324/671 |
| 7,270,483 B2 | * | 9/2007 | Ishiguro | F16C 33/586 |
| | | | | 384/448 |
| 9,494,196 B2 | * | 11/2016 | Sausset | G01P 3/443 |
| 9,863,477 B2 | * | 1/2018 | Mol | F16C 19/06 |

FOREIGN PATENT DOCUMENTS

DE 102015203861 A1 * 9/2016 ............ F16C 33/583

* cited by examiner

*Primary Examiner* — Phillip A Johnson
(74) *Attorney, Agent, or Firm* — Garcia-Zamor Intellectual Property Law; Ruy Garcia-Zamor; Bryan Peckjian

(57) ABSTRACT

A bearing includes at least one bearing ring, a target ring and a coupling element. The coupling element is provided for maintaining the relative position of the bearing ring to the target ring. The coupling element includes an alignment surface that is adapted to align the target ring with one of a housing or a shaft into/onto which the bearing ring is to be mounted.

18 Claims, 1 Drawing Sheet

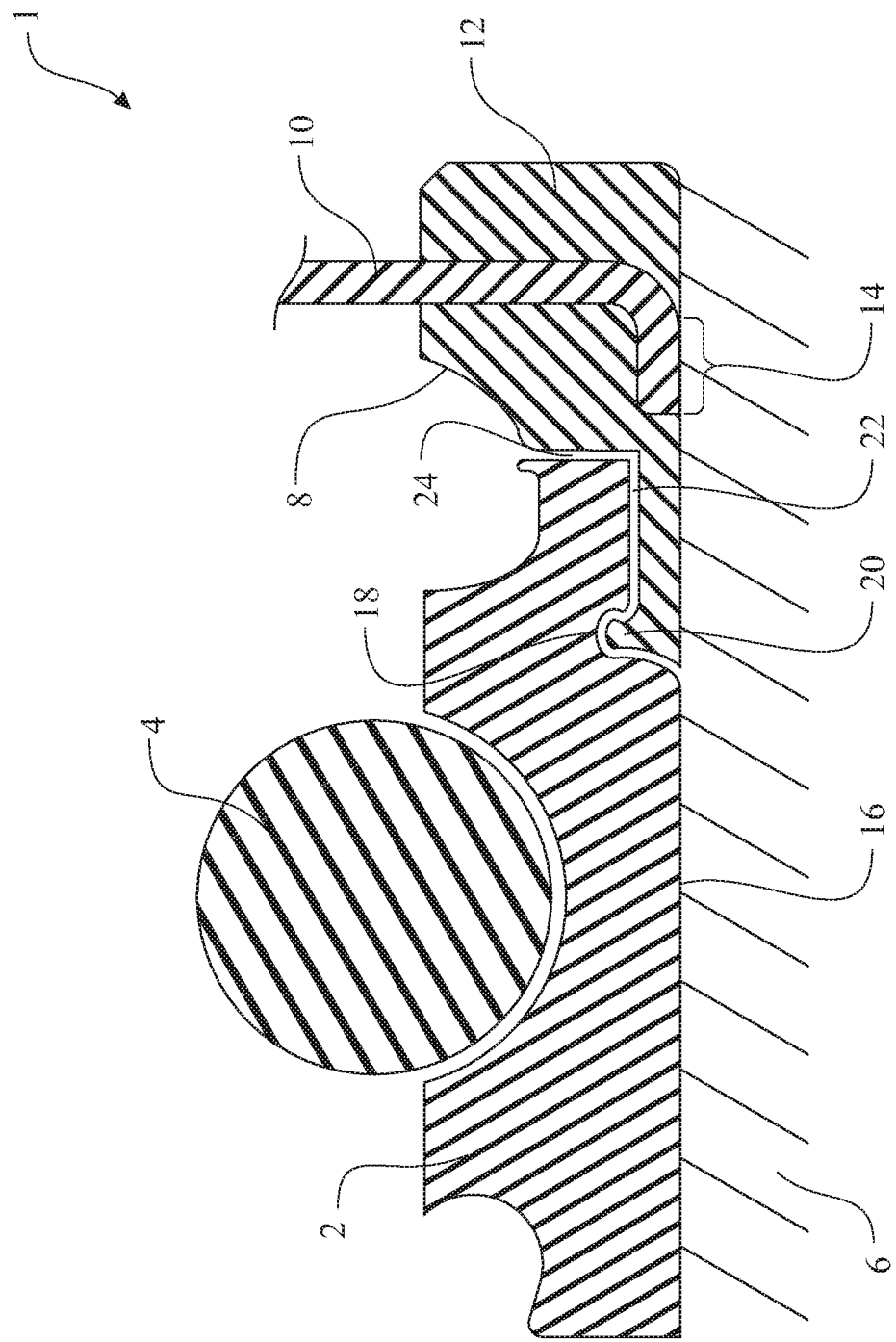

BEARING

CROSS-REFERENCE TO RELATED APPLICATIONS

This application claims priority to German patent application no. 102018220030.0 filed on Nov. 22, 2018, the contents of which are fully incorporated herein by reference.

FIELD OF THE INVENTION

The present invention relates to a bearing with at least one bearing ring, a target ring and a coupling element, to a bearing arrangement comprising such a bearing and a housing or shaft and to a method for mounting a bearing into a housing or onto a shaft.

BACKGROUND OF THE INVENTION

For monitoring a movement of the bearing or of a shaft to which the bearing is coupled, target or measuring rings may be used in combination with sensors. In order to be able to monitor such a movement correctly, a good coaxial accuracy between the part of the bearing to which the target ring is coupled and the target ring is needed. This required accuracy necessitates an accurate surface that carries the target ring, which may be for example a surface of an inner or outer ring of the bearing.

In order to provide the appropriate surface, it is necessary to perform a machining operation after heat treatment operation of the corresponding surface, which leads to significant manufacturing costs.

It is thus an object of the present invention to provide a bearing and a bearing arrangement which are cost-effectively manufactured and to provide a mounting method for mounting the bearing onto a shaft or into a housing.

BRIEF SUMMARY OF THE INVENTION

This object is solved by a bearing comprising:
at least one bearing ring;
a target ring; and
a coupling element,
wherein the coupling element is provided for maintaining a relative position of the bearing ring to the target ring,
wherein the coupling element comprises an alignment surface that is adapted to align the target ring with one of a housing or a shaft, and
wherein the bearing ring is to be mounted in accordance with at least one of into and onto the alignment surface.

This object is solved by a bearing arrangement comprising:
a bearing comprising:
at least one inner ring,
one outer ring, and
a target ring; and
one of a housing or shaft,
wherein a coupling element is provided for maintaining a relative position of one of the inner ring or the outer ring to the target ring, and
wherein the coupling element comprises an alignment surface which is adapted to align the target ring with the housing or the shaft into/onto which the inner ring or the outer ring is mounted.

This object is solved by a method for mounting a bearing into a housing or onto a shaft,
the bearing including at least one bearing ring, a target ring and a coupling element into a housing or onto a shaft,
the bearing arranged wherein the coupling element is provided for maintaining a relative position of the bearing ring to the target ring,
wherein the coupling element comprises an alignment surface that is adapted to align the target ring with one of a housing or a shaft, and
wherein the bearing ring is to be mounted in accordance with at least one of into and onto the alignment surface,
the method comprising steps of:
pre-assembling a coupling element between the bearing ring and the target ring for maintaining the relative position of the bearing ring to the target ring, and
mounting the pre-assembled bearing ring, the target ring and the coupling element into the housing or onto the shaft and thereby aligning the target ring and the bearing ring with the housing or the shaft and aligning the target ring to the bearing ring.

The bearing comprises at least an inner ring, an outer ring, and a target ring which is arranged in the vicinity of either the inner ring or the outer ring. In the following, the ring at which the target ring is arranged will be referred to simply as bearing ring.

For monitoring a movement of the bearing or a shaft/housing onto/into which the bearing is mounted, an alignment of the bearing ring and the target ring in relation to each other is required. As described above, until now for such an alignment, an accurate surface of the bearing ring that carries the target ring was needed.

Usually, the alignment of the target ring and the inner/outer ring to each other requires an accurately machined surface of both the inner/outer ring and the target ring. The basic idea of the invention consists in the usage of an already accurately machined reference surface to which the target ring is aligned. Such surfaces may be provided for example by a housing for outer ring rotating applications or by a shaft for inner ring rotation applications. However, these surfaces, housing or shaft, are only available after assembly of the bearing in the housing or on the shaft. On the other hand, the target ring and the bearing ring are usually delivered as a unit and need to be mounted as a unit into the housing/onto the shaft.

Hence, according to the invention, a coupling element is proposed for pre-assembling the bearing with the bearing ring and the target ring. The pre-assembled bearing is then installed into the housing/onto the shaft instead of installing separate components. Consequently, the coupling element is not used for aligning the target ring and the bearing ring, but only for preassembling the target ring and the bearing ring, wherein the target ring and the bearing ring are in rough position to each other. Hence, the surfaces between the bearing ring, the coupling element and the target ring do not need to be accurately machined.

In order to provide an alignment of the target ring and the bearing ring, the coupling element has an alignment surface for aligning the coupling element and thereby the target ring to the housing/shaft as well as to the bearing ring. This automatic alignment of the target ring takes place during mounting of the bearing into the housing/onto the shaft. When the bearing is mounted onto the shaft or into the housing, the accurately machined surface of the bearing ring and the accurately machined surface of the coupling element are aligned with the accurately machined surface of the housing/shaft, and, due to the coupling between the target ring and the coupling element, also the target ring is in a defined position in relation to the shaft/housing as well as to the bearing ring.

Advantageously, the overall number of accurately machined surfaces may be reduced as only one surface of the bearing ring and one surface of the coupling element needs to be accurately machined to be alignable with the same accurately machined surface of the shaft/housing. Thus, it is not necessary to provide an accurately machined surface on the target ring and a corresponding accurately machined surface on the bearing's outer/inner ring as the coupling element may use a carrying surface of the bearing ring which may have a lower accuracy. In other words, the function of the coupling element is not the positioning of the target ring in relation to the bearing ring but holding the target ring together with the bearing ring up to assembly of these elements to the application, i.e. the shaft or the housing.

According to an embodiment, an axial and/or radial clearance is provided between the coupling element and the bearing ring. Based on such an axial and/or radial clearance, the relative position between the coupling element and the bearing ring is not fixed and that they may move against each other in the region of the clearance(s). Thus, when the bearing ring and the coupling element are aligned at the alignment surface of the house/shaft, the coupling element may move relative to the bearing ring due to the clearance (s).

According to a further preferred embodiment, the target ring and the coupling element are unmovably fixed to each other or integrally formed. Thereby, also the target ring is aligned with the shaft/housing as well as with the bearing ring when the coupling element is aligned with the shaft/housing. Thus, the same reference surface of the shaft/housing may be used for the target ring, or more exactly the coupling element, and the bearing ring of the bearing. Thus, it is sufficient to provide accurately machined surfaces on the coupling element, the bearing outer diameter and the surface of the housing/shaft instead of requiring accurately machined surfaces on the target ring, a shoulder surface of the bearing ring to which the target ring is to be coupled, the bearing outer diameter and the surface of the housing/shaft.

The unmovable coupling between the coupling element and the target ring may be provided for example by using a welded or glued connection. Also, other kinds of connection are possible, for example using screws, bolts or overmolding. The target ring may be formed from sheet metal.

According to a further embodiment, the coupling element comprises a metal ring to which the target ring is unmovable attached, wherein the metal ring provides the alignment surface. This embodiment provides the advantage that the metal ring is rigid and may be easily manufactured and machined for providing an accurate surface for alignment. Thus, the coupling element needs only one element, i.e. the metal ring, which has an accurately machined surface for aligning the target ring. The metal ring may be embedded into the coupling element or may be unmovably otherwise connected to the coupling element. Alternatively, the coupling element may be formed by the metal ring.

According to a further embodiment, the coupling element is attached to the bearing ring using a detachable connection. According to a preferred embodiment, the detachable connection is a clipping or snapping mechanism. Such a clipping mechanism may provide an easy and fast connection between the coupling element and the bearing ring.

The bearing ring may comprise a recess and the coupling element may comprise a bulge which corresponds to the recess and which may snap into the recess. Alternatively, the bearing ring may comprise a bulge and the coupling element may comprise a recess. Using such a clipping or snapping mechanism may provide an easy way to couple the bearing ring and the coupling element. Other connection types are also possible.

According to a further aspect, a bearing arrangement is provided which comprises a bearing and a housing or shaft. The bearing comprises at least one inner ring, one outer ring and a target ring as described above. A coupling element is provided for maintaining the relative position of one of the inner ring or the outer ring to the target ring and comprises an alignment surface which is adapted to align the target ring with the housing or the shaft into/onto which the inner ring or the outer ring is mounted.

According to a further aspect, a method for mounting a bearing into a housing or onto a shaft is provided, wherein the bearing comprises at least one bearing ring, a target ring and a coupling element as described above. The method comprises the steps of: pre-assembling a coupling element between the bearing ring and the target ring for maintaining the relative position of the bearing ring and the target ring, and mounting the pre-assembled bearing into the housing or onto the shaft and thereby aligning the target ring and the bearing ring with the housing or the shaft and aligning the target ring to the bearing ring.

Further advantages and preferred embodiments are disclosed in the claims, the description and the FIGURES. It should be further noted that a person skilled in the art may regard or use the presented features individually or combine the presented features otherwise than indicated without extending the scope of the invention.

In the following, the present invention will be described by means of embodiments shown in the FIGURES. The shown embodiments are exemplarily, only, and are not intended to limit the scope of protection. The scope of protection is solely defined by the attached claims.

BRIEF DESCRIPTION OF THE DRAWING

FIG. 1 presents a cross section of a bearing with a bearing ring, a target ring and a coupling element.

In the following, same or similar functioning elements are indicated with the same reference numerals.

FIG. 1 presents a bearing 1. The bearing 1 comprises an inner ring and an outer ring (only one bearing ring 2 is shown), between which rolling elements 4 are arranged. Depending on the application, the inner ring or the outer ring 2 may be coupled to a shaft or housing 6 for providing a bearing arrangement.

DETAILED DESCRIPTION OF THE INVENTION

A target ring 12 is provided in the vicinity of the bearing 1. For monitoring a movement of the bearing 1, an alignment of the bearing ring 2 and the target ring 12 in relation to each other is required. Until now, an accurately machined surface of the bearing ring 2 as well as of the target ring 12 was required. According to the herein described bearing 1, a coupling element 8 is provided which fulfills the functionality of aligning the target ring 12 to the bearing ring 2 and to the shaft/housing 6 as will be described in the following.

The coupling element 8 comprises a metal ring 10 and is unmovably attached to the target ring 12. The metal ring 10 may be for instance welded or bonded to the coupling element 8. Further, the target ring 12 may be welded or bonded to the metal ring 10. Other forms of attachment are also possible.

Further, the coupling element 8 is attached to the bearing ring 2 for coupling the target ring 12 with the bearing ring 2. The coupling element 8 is attached to the bearing ring 2 using a detachable connection, in particular a clipping mechanism. As shown in FIG. 1, the bearing ring 2 comprises a recess 18 into which a bulge 20 of the coupling element 8 may engage. Alternatively, the bearing ring 2 may comprise the bulge 20 and the coupling element 8 may be provided with the recess 18.

For allowing an alignment of the target ring 12 and the bearing ring 2, the coupling element 8 and the bearing ring 2 are movably coupled which means that there is some play between the coupling element 8 and the bearing ring 2. For this purpose, axial and/or radial clearances 22, 24 are provided between the bearing ring 2 and the coupling element 8 so that the coupling element 8 may move relatively to the bearing ring 2 during mounting of the unit of bearing ring 2, coupling element 8 and target ring 12 onto the shaft/into the housing 6.

When mounting the unit of bearing ring 2 and coupling element 8 (including the target ring 12 and the metal ring 10) to the shaft/housing 6, the bearing 2 and the coupling element 8 are aligned with the shaft/housing 6. For this alignment, the same alignment surface 16 of the shaft/housing 6 is used for the bearing ring 2 and the coupling element 8 and thus also the target ring 12. Thus, the bearing 2 only needs one alignment surface for aligning with the shaft/housing 6 and the coupling element 8 needs one alignment surface (provided by a surface 14 of the metal ring 10) for aligning with the shaft/housing 6.

At the same time, when mounting the bearing 2 and the coupling element 8, also the target ring 12 is aligned with the shaft/housing 6 and the bearing ring 2. As the target ring 12 is unmovably attached to the coupling element 8, the alignment of the coupling element 8 automatically leads to an alignment of the target ring 12. Thus, after mounting the bearing 2 and the coupling element 8 into the shaft/into the housing 6, the target ring 12 is in a defined position in relation to the shaft/housing 6 as well as to the bearing ring 2 and an accurate monitoring of the bearing 1 may be ensured.

In summary, as it is not necessary to align the target ring and the bearing ring in relation to each other and in addition in relation to the shaft/housing, the manufacturing of the components and the installation onto the shaft/into the housing may be simplified. In particular, a surface of the shaft/housing and a surface of the bearing ring, which are already accurately machined, may be used for alignment and it is not necessary to provide additional surfaces with such accuracy. Thus, the overall manufacturing costs may be reduced.

Reference Number Descriptions

| Ref. No. | Description |
| --- | --- |
| 1 | bearing |
| 2 | bearing ring |
| 4 | rolling element |
| 6 | shaft/housing |
| 8 | coupling element |
| 10 | metal ring |
| 12 | target ring |
| 14 | alignment surface |

-continued

Reference Number Descriptions

| Ref. No. | Description |
| --- | --- |
| 16 | alignment surface |
| 18 | recess |
| 20 | bulge |
| 22 | clearance |
| 24 | clearance |

What is claimed is:

1. A bearing comprising:
   at least one bearing ring;
   a target ring; and
   a coupling element,
   wherein the coupling element is provided for maintaining a relative position of the bearing ring to the target ring,
   wherein the coupling element comprises an alignment surface that is adapted to align the target ring with one of a housing or a shaft,
   wherein the bearing ring is to be mounted in accordance with at least one of into and onto the alignment surface, and
   wherein the coupling element is attached to the bearing ring using a detachable connection.

2. The bearing according to claim 1, wherein at least one of (a) an axial clearance and (b) radial clearance is provided between the coupling element and the bearing ring.

3. The bearing according to claim 1, wherein the coupling element is at least one of:
   (a) unmovably coupled with the target ring, and
   (b) integrally formed with the target ring.

4. The bearing according to claim 3, the coupling element further comprising a metal ring,
   wherein the target ring is unmovably attached to the metal ring, and
   wherein the metal ring provides the alignment surface.

5. The bearing according to claim 1, wherein the metal ring is L-shaped.

6. The bearing according to claim 1, wherein the detachable connection is a clipping mechanism.

7. The bearing according to claim 6, the bearing having an arrangement in order to provide the clipping mechanism, the arrangement being one of:
   (a) the bearing ring further comprising a recess and the coupling element further comprises a bulge corresponding to the recess, or
   (b) the bearing ring further comprising a bulge and the coupling element further comprises a recess corresponding to the bulge.

8. A bearing arrangement comprising:
   a bearing comprising:
      at least one inner ring,
      one outer ring, and
      a target ring; and
   one of a housing or shaft,
   wherein a coupling element is provided for maintaining a relative position of one of (a) the at least one inner ring or (b) the outer ring to the target ring,
   wherein the coupling element comprises an alignment surface that aligns the target ring with the housing or the shaft into/onto which the at least one inner ring or the outer ring is mounted, and
   wherein the coupling element forms one of the group of a radially extending bulge and a radially extending recess, one of the (a) the at least one inner ring and (b)

the outer ring forms the other of the group of a radially extending bulge and a radially extending recess.

9. The bearing arrangement according to claim 8, wherein the one of (a) the at least one inner ring or (b) the outer ring is to be mounted in accordance with at least one of into and onto the alignment surface.

10. The bearing arrangement according to claim 9, wherein an axial clearance and a radial clearance are provided between the coupling element and the one of (a) the at least one inner ring or (b) the outer ring.

11. The bearing arrangement according to claim 10, wherein the axial clearance and the radial clearance intersect at an intersection point, the radial clearance extending radially outwardly from the intersection point.

12. The bearing arrangement according to claim 9, wherein the coupling element is at least one of:
   (a) unmovably coupled with the target ring and
   (b) integrally formed with the target ring.

13. The bearing arrangement according to claim 12, the coupling element further comprising a metal ring,
   wherein the target ring is unmovably attached to the metal ring, and
   wherein the metal ring provides the alignment surface.

14. The bearing arrangement according to claim 9, wherein the coupling element forms the radially extending bulge,
   wherein one of the (a) the at least one inner ring and (b) the outer ring forms the radially extending recess, and
   wherein the coupling element is attached to one of (a) the at least one inner ring or (b) the outer ring using a detachable connection.

15. The bearing arrangement according to claim 14, wherein the detachable connection is a clipping mechanism.

16. A method for mounting a bearing including at least one bearing ring, a target ring and a coupling element into a housing or onto a shaft,
   the bearing arranged wherein the coupling element is provided for maintaining a relative position of the bearing ring to the target ring,
   wherein the coupling element comprises an alignment surface that aligns the target ring with one of a housing or a shaft, and
   wherein the bearing ring is to be mounted in accordance with at least one of into and onto the alignment surface,
   the method comprising steps of:
   pre-assembling a coupling element between the bearing ring and the target ring for maintaining the relative position of the bearing ring to the target ring, and
   mounting the pre-assembled bearing ring, the target ring and the coupling element into the housing or onto the shaft and thereby aligning the target ring and the bearing ring with the housing or the shaft and aligning the target ring to the bearing ring such that a radially innermost surface of the target ring is parallel to a radially innermost surface of the coupling element.

17. The method for mounting a bearing according to claim 16, further comprising a step of: attaching the coupling element to the bearing ring using a detachable connection.

18. The method for mounting a bearing according to claim 16, further comprising a step of: attaching the coupling element to the bearing ring using a clipping mechanism.

* * * * *